Patented Mar. 11, 1924.

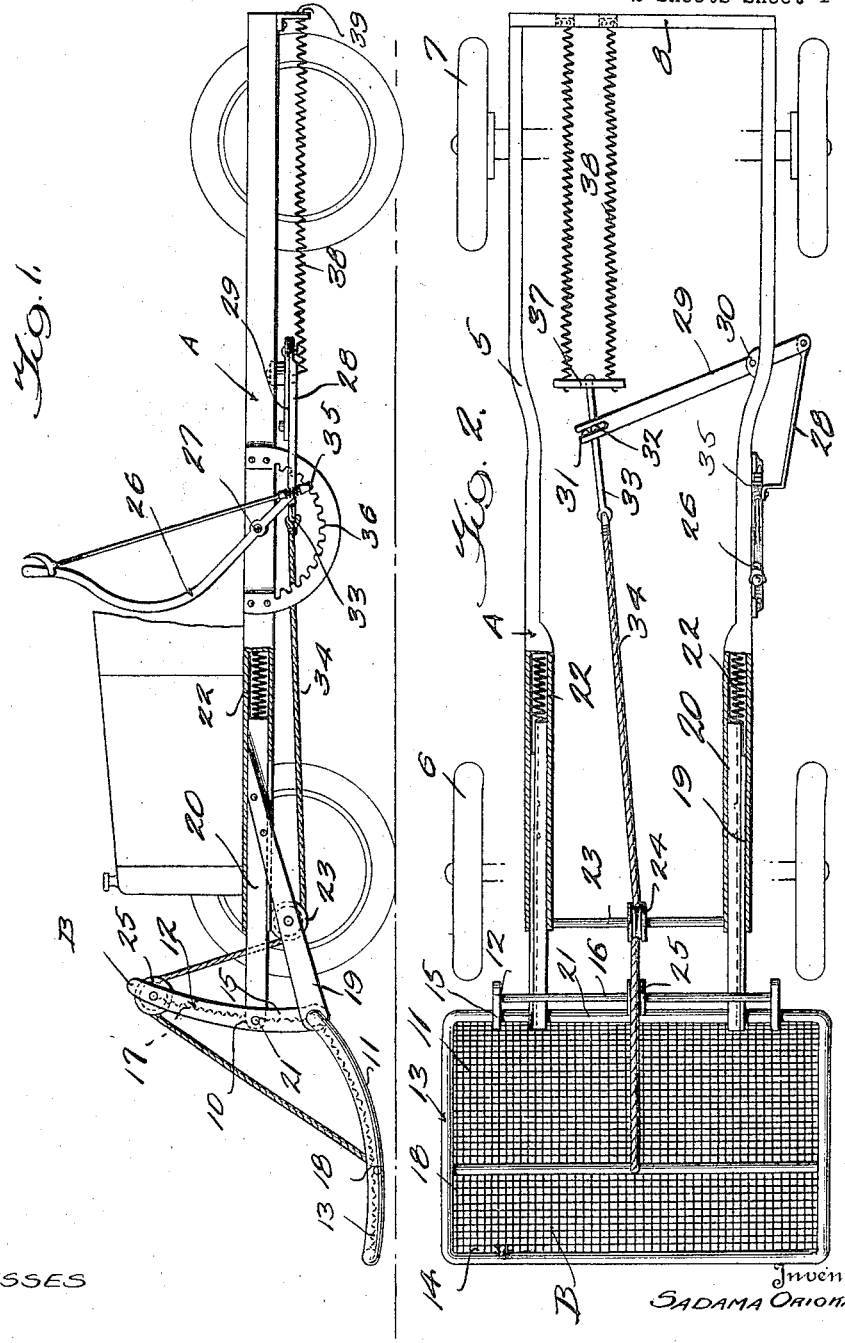

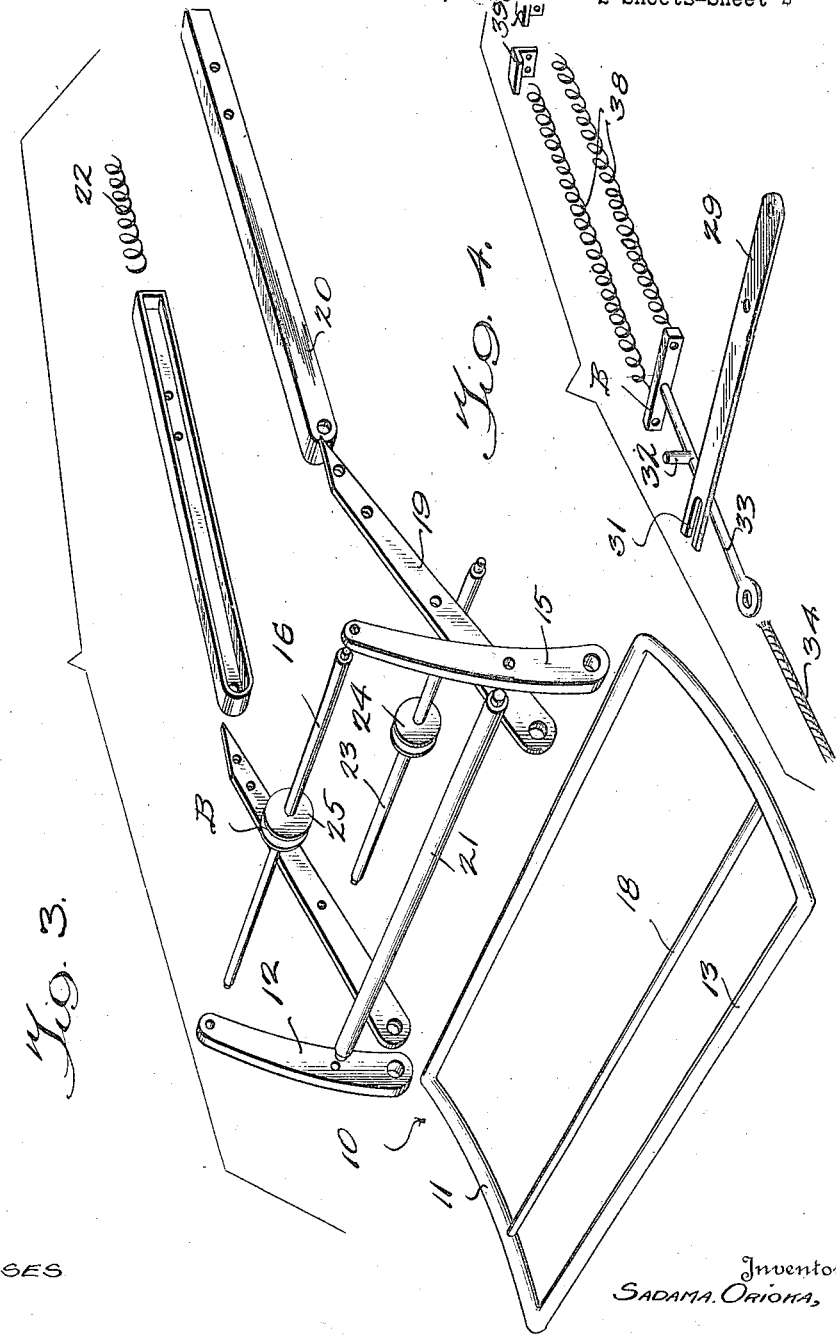

1,486,540

UNITED STATES PATENT OFFICE.

SADAMA ORIOKA, OF HONOLULU, TERRITORY OF HAWAII.

AUTO SAFETY DEVICE.

Application filed October 5, 1923. Serial No. 666,782.

*To all whom it may concern:*

Be it known that I, SADAMA ORIOKA, a subject of Japan, residing at Honolulu, Territory of Hawaii, have invented certain new and useful Improvements in an Auto Safety Device, of which the following is a specification.

This invention relates to attachments for motor vehicles and the primary object of the invention is to provide a safety appliance for automobiles for effectively preventing injury to persons struck by the automobile, the attachment embodying a fender carried by the forward end of the automobile for receiving the person struck by the automobile, thereby effectively preventing the wheels of the automobile from passing over the person struck.

Another object of the invention is the provision of novel means for mounting the fender upon the forward end of the vehicle, said means embodying shock absorbing springs, so as to lessen the shock of the fender striking a person.

Another object of the invention is to provide novel means for holding the fender in a raised inoperative position, when the same is not in use.

A still further object of the invention is to provide an improved device of the above character, which will be durable and efficient in use, one that will be simple and easy to manufacture, and one which can be placed upon the market at a small cost.

With these and other objects in view, the invention consists in the novel construction, arrangement and formation of parts as will be hereinafter more fully described and claimed.

In the drawings:

Figure 1 is a fragmentary side elevation of a motor vehicle partly in section illustrating the improved safety appliance incorporated therewith.

Figure 2 is a fragmentary plan view of a chassis of an automobile partly in section illustrating the improved safety appliance connected thereto.

Figure 3 is a perspective view of a portion of the improved appliance showing the parts thereof disconnected from one another, and Figure 4 is a detail perspective view illustrating a portion of the means for operating the fender, with the various parts thereof disconnected.

Referring to the drawings in detail, wherein similar reference characters designate corresponding parts throughout the several views, the letter A generally indicates a motor vehicle of any preferred type or character and B the improved safety appliance therefor.

The motor vehicle A as shown embodies the usual longitudinal side beams 5, and the front and rear pairs of ground wheels 6 and 7. The side beams 5 can be connected at their rear ends by means of a cross bar or the like 8.

The improved safety appliance B consists of a fender 10 including a lower section 11 and an upper section 12.

The lower section includes an iron frame work 13 for supporting a net or the like 14. The upper section 12 embodies upstanding arms 15 carrying a transverse cross bar 16. The arms 15 can also have attached thereto any preferred type of netting or the like 17. The side bars of the frame 13 also carries a cross bar 18, for a purpose, which will be hereinafter more fully described. The rear cross bar of the frame 13 is rockably mounted in forwardly extending downwardly inclined arms 19 which are secured at their rear ends to the forwardly extending supporting beams 20. The forward terminals of the beams 20 are secured in any preferred way to the upstanding arms 12. The lower terminals of the arms 12 can rockably support the rear cross bar of the frame 13 so as to permit the lower section 11 of the fender 10 to rock thereon. The supporting beams 20 are slidably associated with the side beams 5 of the motor vehicle in any preferred way and as shown the forward ends of the side beams are enlarged and provided with longitudinally extending guide ways for receiving said supporting beams 20, and I provide shock absorbing springs 22 for engaging the rear ends of the beams, so as to lessen the shock incident to the striking of a person by the fender. The frame of the vehicle also supports a forward cross bar 23, on which is rotatably mounted a guide pulley 24. The guide pulley 24 is in direct alignment with a guide pulley 25 rotatably mounted upon the cross bar 16.

In order to bring about the raising of the fender, when the same is not in use, I provide a hand lever 26, which is pivotally secured at a point intermediate its ends as at 27 to one side beam 5 of the chassis of a motor vehicle. This hand lever 26 adjacent to its lower end and below the pivot point 27 thereof has pivotally connected thereto a link 28, which is in turn connected to a lever 29. This lever 29 is pivoted at a point intermediate its ends to the same side beam 5, to which the hand lever 26 is secured. The inner end of the lever 29 is provided with a slot 31, which receives a pin 32 carried by the pull rod 33. The forward terminal of the pull rod 33 has secured thereto a pull cable 34, which is in turn trained under the pulley 24 and over the pulley 25. The forward end of the pull cable 34 is secured to the cross bar 18.

It is now obvious that when the lever 26 is rocked rearwardly, that the section 11 of the fender will be raised.

The hand lever 26 can be held in any desired adjusted position by means of a suitable hand operated pawl 35, which is adapted to engage a toothed sector rack 36 secured to one side channel beam 5 of the chassis of the vehicle.

The rear terminal of the pull rod 33 supports a cross rod or head 37, which has connected thereto a pair of springs 38, the rear ends of which are in turn connected by means of brackets 39 to the cross bar 8.

These springs function to facilitate the lifting of the lower section 11 of the fender.

In use of the improved device, the fender section 11 can be normally held in a raised position, and when the driver of the vehicle sees that it is impossible to get out of the way of a person and bring his vehicle to a stop without striking the person, it is merely necessary to release the lever 26 and permit the dropping of the section 11 of the fender into an operative position.

If desired however, the section of the fender 11 can be normally held in a lowered position, so that the same can be always in use, and then it will be only necessary to raise the fender, when the car is placed in a garage or the like.

Changes in detail may be made without departing from the spirit or the scope of this invention.

What I claim as new is:

1. The combination with an automobile including a chassis having longitudinally extending side beams provided with guide ways, of a safety appliance therefor including a frame slidably and resiliently mounted in said guide ways, a fender pivotally secured to the forward end of the slideable and resiliently mounted frame, and a hand lever for raising and lowering the fender.

2. The combination with a motor vehicle, of a safety appliance therefor including a frame slidably associated with the forward end of the motor vehicle, a fender carried by the forward end of the frame including an upper upright section and a lower pivoted section, a hand lever pivotally secured intermediate its ends to the motor vehicle, means for holding the hand lever in an adjusted position, a rockable lever secured to the motor vehicle, a link operatively connecting the hand lever with the second mentioned lever, a pull rod, means operatively connecting the second mentioned lever with the pull rod, guide pulleys carried by the motor vehicle and upright section of the fender, a pull cable trained about the guide pulleys, and connected respectively to the pull rod and to the lower section of the fender, and coil springs secured to the rear end of the pull rod and the automobile.

In testimony whereof I affix my signature in presence of two witnesses.

SADAMA ORIOKA.

Witnesses:
  J. MAEDA,
  S. FUJINAKA.